United States Patent
Kishine et al.

(10) Patent No.: US 10,994,236 B2
(45) Date of Patent: May 4, 2021

(54) HONEYCOMB FILTER

(71) Applicant: NGK Insulators, Ltd., Nagoya (JP)

(72) Inventors: Kimiko Kishine, Nagoya (JP);
Fumihiko Yoshioka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/815,619

(22) Filed: Mar. 11, 2020

(65) Prior Publication Data
US 2020/0306680 A1    Oct. 1, 2020

(30) Foreign Application Priority Data

Mar. 29, 2019   (JP) .............................. JP2019-066136

(51) Int. Cl.
*B01D 46/24* (2006.01)

(52) U.S. Cl.
CPC ......... *B01D 46/244* (2013.01); *B01D 46/247* (2013.01); *B01D 46/2429* (2013.01); *B01D 46/2459* (2013.01); B01D 2046/2433 (2013.01); B01D 2046/2481 (2013.01); B01D 2279/30 (2013.01)

(58) Field of Classification Search
CPC  B01D 46/2429; B01D 46/244; B01D 46/247; B01D 2046/2433; B01D 46/2459

USPC .................... 422/177, 180; 55/523; 428/116
See application file for complete search history.

(56) References Cited

U.S. PATENT DOCUMENTS

2006/0112669 A1 *  6/2006  Yamada ................ F01N 3/0222
                                                                      55/523
2006/0185335 A1    8/2006  Ichikawa

FOREIGN PATENT DOCUMENTS

| EP | 2 481 542 A1 | 8/2012 |
| JP | H07-042534 A1 | 2/1995 |
| JP | 2006-231162 A1 | 9/2006 |
| JP | 2015-047554 A1 | 3/2015 |
| WO | 2011/036971 A1 | 3/2011 |

* cited by examiner

*Primary Examiner* — Tom P Duong
(74) *Attorney, Agent, or Firm* — Burr & Brown, PLLC (57) ABSTRACT

A honeycomb filter includes a pillar-shaped honeycomb structure having porous partition walls placed, surrounding a plurality of cells which serve as fluid through channels extending from an inflow end face to an outflow end face; and porous plugging portions provided either at the ends on the inflow end face side of the cells or at the ends on the outflow end face side of the cells, wherein the plugging portions include plugging portions that have voids therein, and in the plugging portions having the voids, porosity including the voids as pores ranges from 68% to 83%.

3 Claims, 3 Drawing Sheets

HONEYCOMB FILTER

The present application is an application based on JP 2019-066136 filed on Mar. 29, 2019 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter which can improve exhaust gas purification performance and effectively restrain plugging portions from falling off from cells when loaded with an exhaust gas purifying catalyst.

Description of the Related Art

Hitherto, as a filter adapted to trap particulate matter in an exhaust gas emitted from an internal combustion engine, such as a diesel engine, or a device adapted to purify toxic gas components, such as CO, HC, and NOx, there has been known a honeycomb filter using a honeycomb structure (refer to Patent Documents 1 to 4). The honeycomb structure has partition walls formed of a porous ceramic, such as cordierite or silicon carbide, and includes a plurality of cells defined by the partition walls. In the honeycomb filter, the foregoing honeycomb structure is provided with plugging portions that alternately plug the open ends on the inflow end face side of the plurality of cells and the open ends on the outflow end face side thereof. In other words, the honeycomb filter has a structure in which inflow cells having the inflow end face side open and the outflow end face side plugged and outflow cells having the inflow end face side plugged and the outflow end face side open are arranged alternately with the partition walls placed therebetween. Further, in the honeycomb filter, the porous partition walls of the honeycomb structure function as filters that trap the particulate matter in an exhaust gas. Hereinafter, the particulate matter contained in an exhaust gas may be referred to as "PM." The "PM" is an abbreviation of "particulate matter."

In recent years, a honeycomb filter for purifying an exhaust gas emitted from an engine of an automobile or the like has been required to achieve a reduction in pressure loss mainly for improving automobile fuel economy performance. As one of the measures for reducing pressure loss, studies have been conducted on "thinner walls" to reduce the thickness of the partition walls of a honeycomb structure and "higher porosity" to further enhance the porosity of partition walls as compared with the conventional one.

[Patent Document 1] JP-A-2015-047554
[Patent Document 2] WO2011/036971
[Patent Document 3] JP-A-2006-231162
[Patent Document 4] JP-A-07-042534

Conventional honeycomb filters have been posing a problem in that, when the honeycomb filters are loaded with an exhaust gas purifying catalyst, it is difficult to obtain satisfactory exhaust gas purification performance. For example, in recent years, there has been a demand for improving the purification performance of honeycomb filters for purifying exhaust gases emitted from the engines of automobiles in order to comply with exhaust gas regulations which become more stringent every year because of the awareness of environmental issues. To respond to the demand, it has been required, for example, to promptly activate a catalyst loaded in a honeycomb filter by increasing the temperature rising speed of the catalyst. Hence, there have been requests for developing a honeycomb filter capable of promptly providing satisfactory exhaust gas purification performance.

Further, conventional honeycomb filters pose a problem in that plugging portions easily fall off from the ends of cells. There has been another problem in that the plugging portions are damaged due to various types of stresses applied to the honeycomb filters even if the plugged portions do not fall off.

For example, when a honeycomb filter is used as a filter for purifying an exhaust gas, the honeycomb filter is sometimes used by being housed in a can body, such as a metal case. Housing a honeycomb filter in a can body, such as a metal case, may be referred to as canning. When canning a honeycomb filter, the honeycomb filter is held in a can body by applying a surface pressure to the circumferential surface of the honeycomb filter through the intermediary of a holding material, such as a mat. Even when such canning is performed, plugging portions fall off from the ends of cells or the plugging portions are damaged in some cases. In particular, the foregoing holding material, such as a mat, is designed to be slightly shorter than the length in an axial direction of the honeycomb filter, and an edge of the holding material is sometimes placed at a position slightly toward the inner side from an end face of the honeycomb filter. In such a case, sometimes, in the cells positioned on the circumferential side of the honeycomb filter, the edge of the holding material is inconveniently positioned at the boundary between the plugging portions and the void portions of the cells, causing the plugging portions to easily fall off due to a high stress applied to the vicinity of the boundary from the holding material.

SUMMARY OF THE INVENTION

The present invention has been made in view of the problems with the prior arts described above. The present invention provides a honeycomb filter which, when loaded with an exhaust gas purifying catalyst, can improve exhaust gas purification performance and effectively restrain plugging portions from falling off from cells.

According to the present invention, a honeycomb filter described below is provided.

According to a first aspect of the present invention, a honeycomb filter is provided including:

a pillar-shaped honeycomb structure having porous partition walls provided, surrounding a plurality of cells which serve as fluid through channels extending from an inflow end face to an outflow end face; and porous plugging portions provided either at the ends on the inflow end face side of the cells or at the ends on the outflow end face side of the cells, wherein the plugging portions include plugging portions that have voids therein, and in the plugging portions having the voids, porosity including the voids as pores ranges from 68% to 83%.

According to a second aspect of the present invention, the honeycomb filter described in the foregoing first aspect is provided, wherein the plugging portions having the voids exist only in a circumferential region in a section that is orthogonal to an extending direction of the cells of the honeycomb structure, and the circumferential region is a region that expands to an eighth cell counted toward a center of the section from a cell positioned at the outermost circumference of the honeycomb structure in the section of the honeycomb structure.

According to a third aspect of the present invention, the honeycomb filter described in the foregoing first or second aspects is provided, wherein each of the plugging portions having the voids has at least one void, an inner diameter of which in a radial direction of an end face of the honeycomb filter ranges from 0.3 mm to 1.1 mm and the inner diameter of which in the extending direction of the cells ranges from 1.0 mm to 4.0 mm.

According to a fourth aspect of the present invention, the honeycomb filter described in any one of the foregoing first to third aspects is provided, wherein the porosity of the partition walls ranges from 50% to 70%.

The honeycomb filter in accordance with the present invention provides an effect that, when loaded with an exhaust gas purifying catalyst, enables exhaust gas purification performance to be improved, exhibits high erosion resistance, and effectively restrains plugging portions from falling off from cells. More specifically, the honeycomb filter provided with the plugging portions having the voids therein features increased porosity of the plugging portions, and minimizes the possibility of the plugging portions falling off from the cells by reducing the stress concentration applied to the boundary area between the honeycomb structure and the plugging portions at the time of canning. Further, the presence of the voids inside the plugging portions suppresses an increase in the mass of the honeycomb filter and improves the temperature rising performance of the honeycomb filter, thus enabling the exhaust gas purifying catalyst to be promptly activated.

DESCRIPTION OF THE PREFERRED EMBODIMENTS

The following will describe embodiments of the present invention; however, the present invention is not limited to the following embodiments. Therefore, it should be understood that those created by adding changes, improvements and the like to the following embodiments, as appropriate, on the basis of the common knowledge of one skilled in the art without departing from the spirit of the present invention are also covered by the scope of the present invention.

(1) Honeycomb Filter

Figure 1:
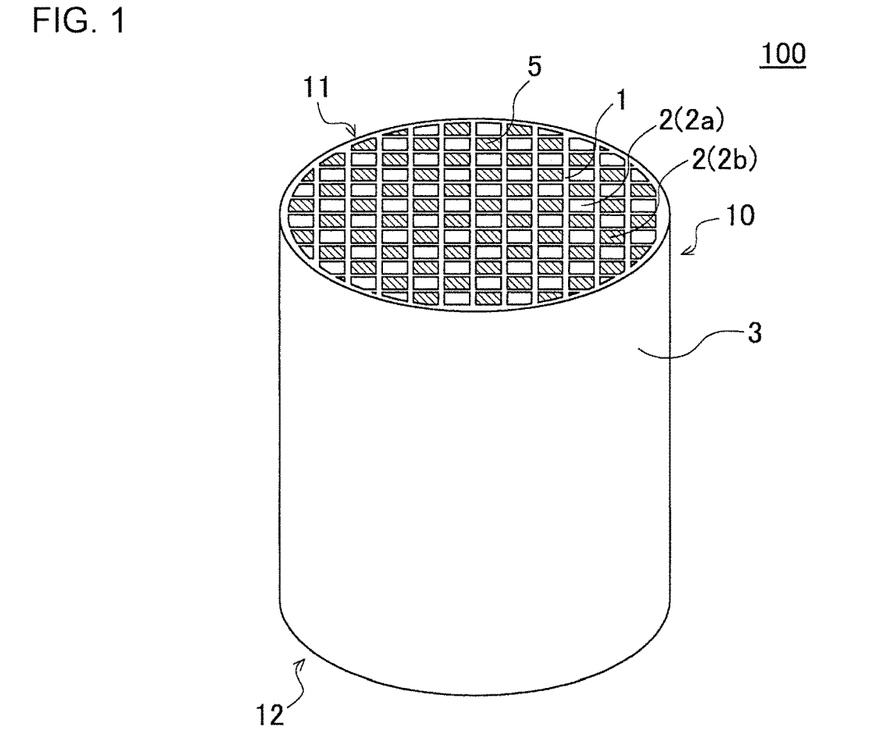
FIG. 1 is a perspective view schematically showing an embodiment of a honeycomb filter in accordance with the present invention.
Figure 2:
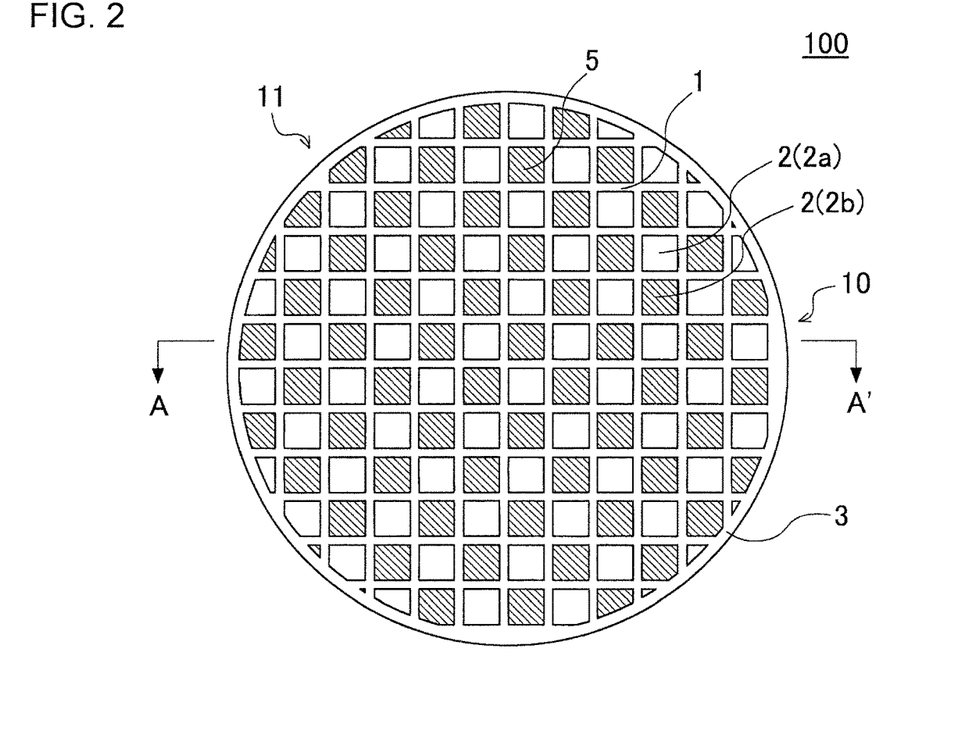
FIG. 2 is a plan view showing the inflow end face side of the honeycomb filter shown in FIG. 1.
Figure 3:
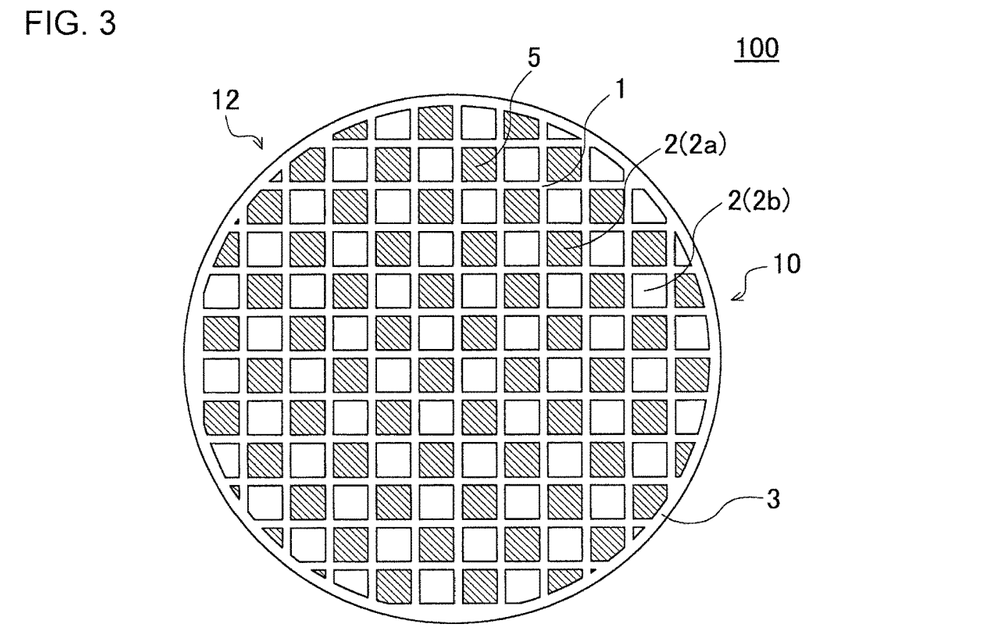
FIG. 3 is a plan view showing the outflow end face side of the honeycomb filter shown in FIG. 1.
Figure 4:
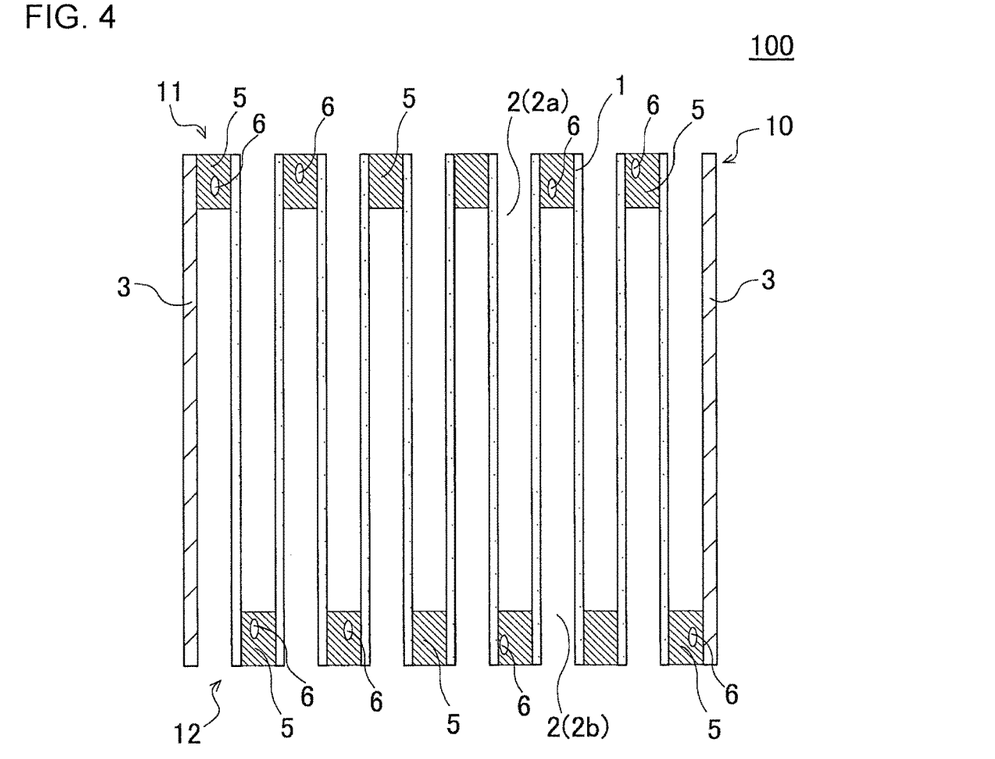
FIG. 4 is a sectional view schematically showing the section taken along A-A' of FIG. 2.

An embodiment of the honeycomb filter in accordance with the present invention is a honeycomb filter 100 shown in FIG. 1 to FIG. 4. FIG. 1 is a perspective view schematically showing the embodiment of the honeycomb filter in accordance with the present invention. FIG. 2 is a plan view of the inflow end face side of the honeycomb filter shown in FIG. 1. FIG. 3 is a plan view of the outflow end face side of the honeycomb filter shown in FIG. 1. FIG. 4 is a sectional view schematically showing a section taken along A-A' of FIG. 2.

As shown in FIG. 1 to FIG. 4, the honeycomb filter 100 includes a honeycomb structure 10 and plugging portions 5. The honeycomb structure 10 has porous partition walls 1 placed, surrounding a plurality of cells 2 which serve as fluid through channels extending from an inflow end face 11 to an outflow end face 12. The honeycomb structure 10 is a pillar-shaped structure having the inflow end face 11 and the outflow end face 12 as both end faces thereof. In the honeycomb filter 100 of the present embodiment, the honeycomb structure 10 further has a circumferential wall 3 provided, encompassing the partition walls 1 on the outer wall side surface thereof.

The plugging portions 5 are provided either at the ends on the inflow end face 11 side of the cells 2 or at the ends on the outflow end face 12 side of the cells 2 to plug the open ends of the cells 2. The plugging portions 5 are porous substances (i.e. porous bodies) composed of a porous material. In the honeycomb filter 100 shown in FIG. 1 to FIG. 4, the predetermined cells 2 having the plugging portions 5 provided at the ends on the inflow end face 11 side and the residual cells 2 having the plugging portions 5 provided at the ends on the outflow end face 12 side are alternately arranged with the partition walls 1 placed therebetween. In the following description, the cells 2 having the plugging portions 5 provided at the ends on the inflow end face 11 side may be referred to as "the outflow cells 2b." The cells 2 having the plugging portions 5 provided at the ends on the outflow end face 12 side may be referred to as "the inflow cells 2a."

The honeycomb filter 100 includes, as the plugging portions 5, plugging portions having the voids 6 therein. More specifically, at least one plugging portion 5 among the plugging portions 5 has a void 6 therein. Further, in the plugging portion 5, the porosity including the void 6 as a pore ranges from 68% to 83%. The term "the porosity including the void 6 as a pore" means the porosity measured by regarding the void 6 as a part of the pores of a porous body. The honeycomb filter 100 configured as described above provides an effect that, when loaded with an exhaust gas purifying catalyst, enables exhaust gas purification performance to be improved, exhibits high erosion resistance, and effectively restrains plugging portions 5 from falling off from the cells 2. The honeycomb filter 100 is particularly effective as the honeycomb filter 100 provided with a honeycomb structure 10 having higher porosity. Providing the plugging portions 5 having the voids 6 therein improves the porosity of the plugging portions 5 and reduces the stress concentration applied to the boundary area between the honeycomb structure 10 and the plugging portions 5 at the time of canning, thus minimizing the possibility of the plugging portions 5 falling off from the cells 2. In addition, the plugging portions 5 having the voids 6 therein suppresses an increase in the mass of the honeycomb filter 100 and improves the temperature rising performance of the honeycomb filter 100, thus enabling an exhaust gas purifying catalyst to be promptly activated.

The term "having the voids 6 therein" means that the voids 6, each of which has a maximum diameter of 0.1 mm or more in one direction, exists in the plugging portion 5 formed of a porous body. The maximum diameter of the void 6 in one direction can be determined from an image obtained by imaging the entire area of the sectional layer of the section of the honeycomb filter 100 by using, for example, industrial X-ray CT scan.

In the plugging portion 5 having the void 6, the porosity including the void 6 as a pore ranges from 68% to 83%, preferably ranges from 70% to 83%, and more preferably ranges from 75% to 83%. In order to reduce the stress concentration applied to the boundary area between the honeycomb structure 10 and the plugging portion 5 at the time of canning, the foregoing porosity preferably ranges from 68% to 83%. In terms of the falling off of the plugging portions 5 that may happen at the time of canning, it is not preferable that the porosity of the plugging portions 5 having the voids 6 be, for example, below 68%. In terms of thermal shock resistance and wear or scraping (erosion) of the plugging portions 5 or the like due to foreign matters that come together with an exhaust gas flow, it is not preferable that the porosity of the plugging portions 5 having the voids 6 exceed 83%.

The porosity of the plugging portions 5 having the voids 6 can be measured as described below. A portion equivalent to one cell that includes one plugging portion 5 and the partition walls 1 around the plugging portion 5 is cut out from the honeycomb filter 100 and processed to remove the partition walls 1 around the plugging portion 5. Thereafter, the mass of the plugging portion 5 is measured, and the porosity is calculated on the basis of the measured mass and the true density of a plugging material constituting the plugging portion 5. When measuring the porosity of the plugging portions 5, the porosity of all the plugging portions 5 provided at the ends of the cells 2 of the honeycomb structure 10 are to be measured.

In the honeycomb filter 100, the plugging portions 5 having the voids 6 and the plugging portions 5 without the voids 6 may be mixed. The ratio of the plugging portions 5 having the voids 6 with respect to the total number of the plugging portions 5 is preferably 50% or more, more preferably ranges from 50% to 70%, further more preferably ranges from 60% to 70%, and particularly preferably ranges from 65% to 70%.

There is no particular restriction on the porosity of the plugging portions 5 without the voids 6. For example, the porosity of the plugging portions 5 without the voids 6 preferably ranges from 50% to 80%, more preferably ranges from 60% to 80%, and particularly preferably ranges from 65% to 75%. The porosity of the plugging portions 5 without the voids 6 preferably remains in the foregoing numerical ranges in terms of the thermal shock resistance and the resistance to the wear or scraping (erosion) due to foreign matters that come together with an exhaust gas flow. The porosity of the plugging portions 5 without the voids 6 can be measured according to the same method as that used for measuring the porosity of the foregoing plugging portions 5 having the voids 6.

There is no particular restriction on the plugging length of the plugging portions 5 in the extending direction of the cells 2. For example, the plugging length of the plugging portions 5 preferably ranges from 3 mm to 9 mm, more preferably ranges from 3 mm to 8 mm, and particularly preferably ranges from 3 mm to 7 mm. It is not preferable that the plugging length of the plugging portions 5 be below 3 mm, because of a greater tendency for the plugging portions 5 to easily fall off or for erosion resistance to deteriorate if the inflow end face 11 of the honeycomb filter 100 is gouged or chipped. It is also not preferable that the plugging length of the plugging portions 5 exceed 9 mm, because the area through which a gas passes decreases, leading to an increase in pressure loss or the deterioration of the exhaust gas purification performance.

Each plugging length of the plugging portions 5 can be measured as described below. A bar having a length which is known and which is larger than the total length of the honeycomb filter 100 is inserted in each of the cells 2, and the plugging length is measured from the difference between the length of a portion of the bar exposed from the honeycomb filter 100 and the length of the bar itself. When measuring each plugging length of the plugging portions 5, the plugging lengths of all the plugging portions 5 provided at the ends of the cells 2 of the honeycomb structure 10 are to be measured.

Figure 5:
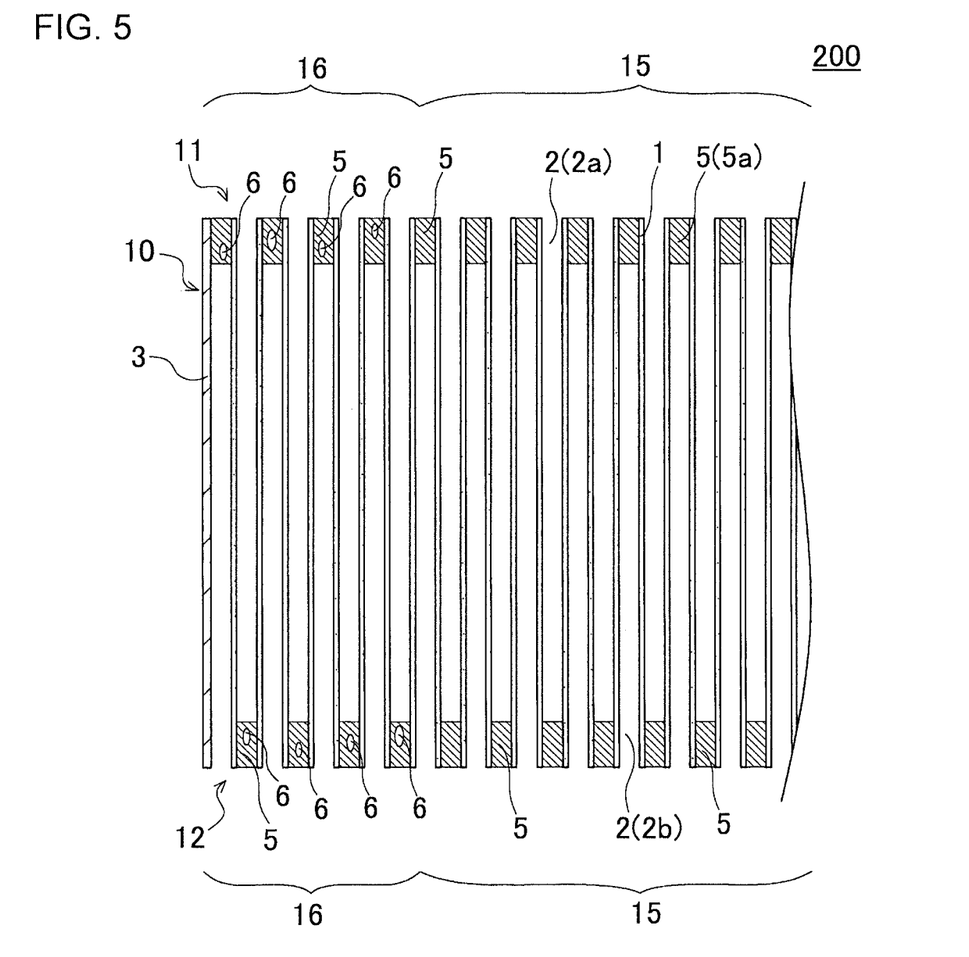
FIG. 5 is a sectional view schematically showing a part of a section parallel to the extending direction of the cells of another embodiment of the honeycomb filter in accordance with the present invention.

The honeycomb filter 100 has a plurality of plugging portions 5 arranged toward the center from the circumference in the radial direction of the section of the honeycomb structure 10. In the honeycomb filter 100, the plugging portions 5 having the voids 6 exist at random in the radial direction of the section of the honeycomb structure 10. In other words, the plugging portions 5 having the voids 6 and the plugging portions 5 without the voids 6 exist in one honeycomb filter 100 in a random manner. All the plugging portions 5 in the honeycomb filter 100 may be the plugging portions 5 having the voids 6. Alternatively, the plugging portions 5 having the voids 6 may exist only in a particular region (area). For example, as in a honeycomb filter 200 shown in FIG. 5, the plugging portions 5 having the voids 6 may exist only in a circumferential region 16 in the section that is orthogonal to the extending direction of the cells 2 of the honeycomb structure 10. FIG. 5 is a sectional view schematically showing a part of the section parallel to the extending direction of the cells of another embodiment of the honeycomb filter in accordance with the present invention. In the honeycomb filter 200 shown in FIG. 5, like constituent elements as those of the honeycomb filter 100 shown in FIG. 1 to FIG. 4 will be assigned like reference numerals and the detailed descriptions thereof will be omitted.

In the honeycomb filter 200 shown in FIG. 5, plugging portions 5 having voids 6 exist only in a circumferential region 16 of a honeycomb structure 10. This configuration is preferable, because the difference in Young's modulus between the plugging portions 5 in the circumferential region 16 and the honeycomb structure 10 increases, thus more effectively restraining the plugging portions 5 in the circumferential region 16 from falling off. In addition, the foregoing configuration is preferable also in terms of enhanced exhaust gas purification performance due to improvement in warming performance and in terms of erosion resistance of the honeycomb filter 200.

The circumferential region 16 refers to a region expanding to the eighth cells 2 counted toward the center of the foregoing section of the honeycomb structure 10 from the cells 2 positioned at the outermost circumference of the honeycomb structure 10. Further, the region expanding on the central side of the foregoing section from the cells 2 positioned closer to the center and right next to the eighth cells 2 (i.e. the ninth cells 2 counted from the cells 2 positioned at the outermost circumference) is defined as a central region 15. Preferably, the plugging portions 5 having voids 6 do not exist in the central region 15 and exist only in the circumferential region 16 in terms of thermal shock resistance and wear or scraping (erosion) of plugging portions 5 or the like caused by foreign matters that come together with an exhaust gas flow.

If the plugging portions 5 having the voids 6 exist only in the circumferential region 16 of the honeycomb structure 10, then all the plugging portions 5 existing in the circumferential region 16 are preferably the plugging portions 5 having the voids 6. Alternatively, however, the plugging portions 5 having the voids 6 and the plugging portions 5 without the voids 6 may be mixed in the circumferential region 16.

The plugging portion 5 in the honeycomb filter 100 shown in FIG. 1 to FIG. 4 preferably has at least one void 6, the inner diameter of which in the radial direction of an end face of the honeycomb filter 100 ranges from 0.3 mm to 1.1 mm and the inner diameter of which in the extending direction of the cells 2 ranges from 1.0 mm to 4.0 mm. Hereinafter, the inner diameter of the void 6 in the radial direction of the end face of the honeycomb filter 100 may be referred to simply as "the inner diameter in the radial direction." Further, the inner diameter of the void 6 in the extending direction of the cells 2 may be referred to as "the inner diameter in the total length direction." The plugging portions 5 having the voids 6, the inner diameter of which in the radial direction ranges from 0.3 mm to 1.1 mm and the inner diameter of which in the total length direction ranges from 1.0 mm to 4.0 mm, provide an effect of reducing the stress concentration applied to the boundary area between the honeycomb structure 10 and the plugging portions 5 at the time of calming. The inner diameters of the voids 6 can be measured according to the method described below. The entire area of the sectional layer of the section of the honeycomb filter 100 is imaged by using industrial X-ray CT scan, and the inner diameters of the voids 6 are measured from the obtained image. The section of the honeycomb filter 100 to be imaged may be a section that is parallel to the extending direction of the cells 2 of the honeycomb filter 100 or a section that is parallel to each end face (an inflow end face 11 or an outflow end face 12) of the honeycomb filter 100.

In the honeycomb structure 10, the porosity of the partition walls 1 preferably ranges from 50% to 70%, and more preferably ranges from 55% to 63%. The honeycomb filter 100 exhibits further marked effect when using the honeycomb structure 10 with high porosity, the porosity of the partition walls 1 ranging from 55% to 63%. The porosity of the partition walls 1 is denoted by a value measured by the mercury press-in method. The porosity of the partition walls 1 can be measured by using, for example, Micromeritics' AutoPore 9500 (trade name). A part of the partition walls 1 is cut out from the honeycomb structure 10 to obtain a test piece, and the measurement of the porosity of the partition walls 1 can be performed by using the test piece obtained as described above. The porosity of the partition walls 1 preferably takes a constant value in the entire honeycomb structure 10. For example, the absolute value of the difference between a maximum value and a minimum value of the porosity of the partition walls 1 of each part is preferably 10% or less.

In the honeycomb structure 10, the thickness of the partition walls 1 preferably ranges from 0.15 mm to 0.30 mm, and more preferably ranges from 0.15 mm to 0.25 mm, and particularly preferably ranges from 0.20 mm to 0.25 mm. The thickness of the partition walls 1 can be measured by using, for example, a scanning electron microscope or a microscope. If the thickness of the partition walls 1 is below 0.15 mm, then a sufficient strength may not be obtained. On the other hand, if the thickness of the partition walls 1 exceeds 0.30 mm, then the pressure loss of the honeycomb filter 100 may increase.

There is no particular restriction on the shapes of the cells 2 defined by the partition walls 1. For example, the shapes of the cells 2 in the section that is orthogonal to the extending direction of the cells 2 may be polygonal, circular, elliptical or the like. A polygonal shape may be triangular, quadrangular, pentagonal, hexagonal, octagonal or the like. The shapes of the cells 2 are preferably triangular, quadrangular, pentagonal, hexagonal or octagonal. Further, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be larger and some other cells may be relatively smaller. In the present invention, the term "cells" means the spaces surrounded by the partition walls.

In the honeycomb structure 10, the cell density of the cells 2 defined by the partition walls 1 preferably ranges from 27 to 51 cells/cm$^2$ and more preferably ranges from 31 to 47 cells/cm$^2$. This configuration makes it possible to suppress an increase in pressure loss while maintaining the PM trapping performance of the honeycomb filter 100.

The circumferential wall 3 of the honeycomb structure 10 may be configured integrally with the partition walls 1 or may be composed of a circumferential coat layer formed by applying a circumferential coating material, encompassing the partition walls 1. Although not shown, the circumferential coat layer can be provided on the circumferential side of the partition walls after the partition walls and the circumferential wall are integrally formed and then the formed circumferential wall is removed by a publicly known method, such as grinding, in a manufacturing process.

There is no particular restriction on the shape of the honeycomb structure 10. The honeycomb structure 10 may be pillar-shaped, the shapes of the inflow end face 11 and the outflow end face 12 being circular, elliptical, polygonal or the like.

There is no particular restriction on the size of the honeycomb structure 10, e.g. the length from the inflow end face 11 to the outflow end face 12 and the size of the section that is orthogonal to the extending direction of the cells 2 of the honeycomb structure 10. Each size may be selected as appropriate such that optimum purification performance is obtained when the honeycomb filter 100 is used as a filter for purifying an exhaust gas. For example, the length from the inflow end face 11 to the outflow end face 12 of the honeycomb structure 10 preferably ranges from 90 mm to 160 mm and more preferably ranges from 120 mm to 140 mm. Further, the area of the section that is orthogonal to the extending direction of the cells 2 of the honeycomb structure 10 preferably ranges from 100 cm$^2$ to 180 cm$^2$ and more preferably ranges from 110 cm$^2$ to 150 cm$^2$.

There is no particular restriction on the material of the partition walls 1. For example, the material of the partition walls 1 preferably includes at least one selected from a group composed of silicon carbide, cordierite, a silicon-silicon carbide composite material, cordierite-silicon carbide composite material, silicon nitride, mullite, alumina, and aluminum titanate.

There is no particular restriction on the material of the plugging portions 5, either. For example, the same material as the material of the partition walls 1 described above can be used.

(2) Manufacturing Method for the Honeycomb Filter

There is no particular restriction on the method for manufacturing the honeycomb filter in accordance with the present invention, and the following method, for example, may be used. First, a plastic kneaded material for producing the honeycomb structure is prepared. The kneaded material for producing the honeycomb structure can be prepared by adding an additive, such as a binder, a pore former, and water, as appropriate, to a material selected from among the foregoing suitable materials of the partition walls as raw material powder.

Subsequently, the kneaded material obtained as described above is subjected to extrusion thereby to obtain a pillar-shaped honeycomb formed body having partition walls that define a plurality of cells, and a circumferential wall provided, surrounding the partition walls. Then, the obtained honeycomb formed body is dried by, for example, microwave and hot air.

Subsequently, plugging portions are placed at the open ends of the cells of the dried honeycomb formed body. More specifically, for example, a plugging material that contains a raw material for forming the plugging portions is first prepared. Then, a mask is provided on the inflow end face of the honeycomb formed body to cover the inflow cells. Next, the plugging material that has been prepared is filled in the open ends of the outflow cells not provided with the mask on the inflow end face side of the honeycomb formed body. Thereafter, for the outflow end face of the honeycomb formed body also, the plugging material is filled in the open ends of the inflow cells by the same method described above.

In the manufacture of the honeycomb filter in accordance with the present invention, desired voids can be selectively formed in the plugging portions by, for example, decreasing the viscosity of a plugging material when filling the plugging material.

Subsequently, the honeycomb formed body with the plugging portions provided at the open ends of one side of the cells is fired to manufacture the honeycomb filter in accordance with the present invention. The firing temperature and the firing atmosphere vary according to a material, and a person skilled in the art can select a firing temperature and a firing atmosphere that are best suited for a selected material.

EXAMPLES

The following will describe the present invention further specifically by examples; however, the present invention is not limited at all by the examples.

Example 1

Ten parts by mass of a pore former, 20 parts by mass of a dispersing medium, and 1 part by mass of an organic binder were added to 100 parts by mass of a cordierite forming raw material and mixed, and the mixture was kneaded to prepare a kneaded material. As the cordierite forming raw material, alumina, aluminum hydroxide, kaolin, talc, and silica were used. As the dispersing medium, water was used. As the organic binder, methylcellulose was used. As a dispersing agent, dextrin was used. As the pore former, coke having an average particle diameter of 15 μm was used.

Subsequently, the kneaded material was subjected to extrusion using a die for making honeycomb formed bodies thereby to obtain a honeycomb formed body, the entire shape of which was a round pillar shape. The shape of the cells of the honeycomb formed body was quadrangular.

Subsequently, the honeycomb formed body was dried by a microwave drier, and further dried by a hot air drier to completely dry the honeycomb formed body. Thereafter, both end faces of the honeycomb formed body were cut to predetermined dimensions.

Subsequently, a plugging material for forming the plugging portions was prepared. Thereafter, by using the plugging material, the plugging portions were formed at the open ends of the cells on the inflow end face side of the dried honeycomb formed body. More specifically, first, a mask was provided on the inflow end face of the honeycomb formed body to cover the inflow cells. Then, the open ends of the outflow cells not provided with the mask were filled with the plugging material having a lower viscosity, thereby forming the plugging portions.

Subsequently, the outflow end face of the honeycomb formed body was also provided with a mask to cover the outflow cells. Then, the open ends of the inflow cells not provided with the mask were filled with the plugging material having a lower viscosity, thereby forming the plugging portions.

Subsequently, the honeycomb formed body in which the plugging portions had been formed was degreased and fired thereby to manufacture the honeycomb filter of Example 1.

The honeycomb filter of Example 1 was round pillar-shaped, and the shapes of the inflow end face and the outflow end face thereof were circular. The diameters of the inflow end face and the outflow end face were 118 mm. Further, the extending-direction length of the cells of the honeycomb filter was 127 mm. In the honeycomb filter of Example 1, the thickness of the partition walls was 0.22 min, the porosity of the partition walls was 55%, and the cell density was 31 cells/cm$^2$. Table 1 shows the thickness of the partition walls, the porosity of the partition walls, and the cell density of the honeycomb filter. The porosity of the partition walls was measured by using Micromeritics' AutoPore 9500 (trade name).

In the honeycomb filter of Example 1, the plugging length of the plugging portions was 5.0 min. Further, in the section that is orthogonal to the extending direction of the cells of the honeycomb structure, the plugging portions existing in the entire area of the section had voids therein. The presence of the voids inside the plugging portions was checked by imaging the entire area of the sectional layer of the section of the honeycomb filter by using industrial X-ray CT scan. The presence of the voids inside the plugging portions is shown in the column of "Presence of voids" of Table 1. The existence area of the plugging portions having the voids is shown in the column of "Existence area" of "Plugging portions having voids" of Table 1. In "Existence area" of Table 1, "Only in circumferential region" denotes that the plugging portions having the voids exist only in the circumferential region of the honeycomb structure. "Entire area" denotes that the plugging portions having the voids exist over the entire area of the honeycomb structure.

The inner diameters of each of the voids inside the plugging portions were measured according to the following method. First, the entire area of the sectional layer of the section of the honeycomb filter was imaged by using industrial X-ray CT scan. Then, the inner diameters of the voids inside each plugging portion were measured from the obtained image. The mean value of the inner diameters in the radial direction of the voids and the mean value of the inner diameters in the total length direction of the voids were calculated. The inner diameter (the mean value) in the radial direction of the voids was 0.9 mm, and the inner diameter (the mean value) in the total length direction of the voids was 3 mm. The inner diameters of the voids are shown in the columns of "Inner dia. in radial direction of void (mm)" and "Inner dia. in total length direction of void (mm)" in Table 1.

The ratio of the number of the plugging portions having the voids with respect to the total number of the plugging portions is shown in the column of "Ratio to total number (%)" of "Plugging portion having voids" of Table 1. In the honeycomb filter of Example 1, all the plugging portions have the voids, so that the foregoing ratio is 100%.

Further, the porosity of the plugging portions having the voids was measured. The porosity of the plugging portions having the voids was 72%. The results are shown in Table 1. In Example 2 and after, which will be discussed later, if a honeycomb filter has plugging portions without the voids, then the porosity of the plugging portions without the voids was separately measured. The porosity of the plugging portions having the voids is shown in the column of "Porosity (with voids) (%)" and the porosity of the plugging portions without the voids is shown in the column of "Porosity (without voids) (%)."

In Examples 1 and 6 and Comparative Example 2, all plugging portions are the plugging portions having the voids, so that the porosity of an area excluding the voids in the plugging portions having the voids was measured according to the following method. To be specific, first, from the measurement results of the foregoing industrial X-ray CT scan, the positions of the voids inside the plugging portions having the voids were identified, and only a portion free of the voids was cut out from the plugging portion having the voids. Then, the porosity of the portion that had been cut out was measured. For Examples 1 and 6 and Comparative Example 2, "Porosity of the portion free of the voids in the plugging portion having the voids" measured as described above is exceptionally shown in the column of "Porosity (without voids) (%)" of Table 1.

Further, on the honeycomb filter of Example 1, "Evaluation of exhaust gas purification performance", "Evaluation of erosion resistance", and "Evaluation of falling off of plugging portions" were carried out according to the following method. Table 2 shows the results.

[Evaluation of Exhaust Gas Purification Performance]

First, exhaust gas purifiers using the honeycomb filters of the examples as the filters for purifying an exhaust gas were fabricated. Each of the fabricated exhaust gas purifiers was connected to an outlet side of an engine exhaust manifold of a 1.2 L direct injection gasoline engine vehicle, and the concentration of NOx contained in the gas emitted through the outflow port of the exhaust gas purifier was measured to determine the NOx purification rate. Based on the value of each measured NOx purification rate, the exhaust gas purification performance was evaluated according to the following evaluation standard. The column of "Ratio of NOx purification rate (%)" of Table 2 shows the value of the NOx purification rate (%) of the exhaust gas purifier using the honeycomb filter of each example when the value of the NOx purification rate of the exhaust gas purifier using the honeycomb filter of Comparative Example 1 is defined as 100%.

Evaluation "Excellent": If the value of the ratio of the NOx purification rate is 110% or more, then the evaluation result is denoted by "Excellent."

Evaluation "Good": If the value of the ratio of the NOx purification rate exceeds 107% and is below 110%, then the evaluation result is denoted by "Good."

Evaluation "Acceptable": If the value of the ratio of the NOx purification rate exceeds 100% and is 107% or less, then the evaluation result is denoted by "Acceptable."

Evaluation "Fail": If the value of the ratio of the NOx purification rate is 100% or less, then the evaluation result is denoted by "Fail."

TABLE 1

| | Honeycomb structure | | | Plugging portion | | | Plugging portion having voids | | | |
| --- | --- | --- | --- | --- | --- | --- | --- | --- | --- | --- |
| | Thickness of partition wall (mm) | Porosity of partition wall (%) | Cell density (cells/cm$^2$) | Presence of void | Porosity (without void) (%) | Existence area | Inner dia. in radial direction of void (mm) | Inner dia. in total length direction of void (mm) | Ratio to total number (%) | Porosity (with void) (%) |
| Example 1 | 0.22 | 55 | 31 | Yes | 65 | Entire area | 0.9 | 3 | 100 | 72 |
| Example 2 | 0.22 | 55 | 31 | Yes | 70 | Only circumferential region | 0.9 | 3 | 70 | 74 |
| Example 3 | 0.22 | 55 | 31 | Yes | 70 | Only circumferential region | 0.8 | 3 | 65 | 73 |
| Example 4 | 0.22 | 55 | 31 | Yes | 69 | Only circumferential region | 0.8 | 3 | 60 | 72 |
| Example 5 | 0.22 | 63 | 47 | Yes | 72 | Only circumferential region | 1 | 3.2 | 70 | 80 |
| Example 6 | 0.22 | 63 | 47 | Yes | 70 | Entire area | 0.6 | 2 | 100 | 73 |
| Example 7 | 0.22 | 63 | 47 | Yes | 71 | Only circumferential region | 0.9 | 2 | 65 | 75 |
| Example 8 | 0.22 | 63 | 47 | Yes | 70 | Only circumferential region | 0.9 | 2 | 60 | 74 |
| Example 9 | 0.24 | 62 | 47 | Yes | 73 | Only circumferential region | 1 | 4 | 55 | 81 |
| Example 10 | 0.19 | 56 | 31 | Yes | 66 | Only circumferential region | 0.7 | 3.5 | 70 | 69 |
| Comparative Example 1 | 0.24 | 62 | 47 | No | 75 | — | — | — | — | — |
| Comparative Example 2 | 0.23 | 54 | 31 | Yes | 65 | Entire area | 0.4 | 3 | 100 | 66 |

[Evaluation of the Falling Off of Plugging Portions]

The side surface of the honeycomb filter of each example was wrapped with a mat according to the following method, and the honeycomb filter wrapped with the mat was pushed into a can body to hold the honeycomb filter by the can body. When wrapping the mat, an edge of the mat was positioned at 5 mm on the inner side from an end face of the honeycomb structure constituting the honeycomb filter, and the entire side surface of the honeycomb filter was covered with the mat. The honeycomb filter was held such that the degree of compression, i.e. the gap bulk density (GBD), of the mat at that time was 0.45 g/cm$^3$, and the occurrence of the falling off of the plugging portions from the cells was checked.

Evaluation "OK": If the "falling off of the plugging portions" does not occur in the honeycomb filter to be evaluated, then the evaluation result is denoted by "OK."

Evaluation "NG": If the "falling off of the plugging portions" occurs in the honeycomb filter to be evaluated, then the evaluation result is denoted by "NG."

[Evaluation of Erosion Resistance]

First, a honeycomb filter was canned (housed) in a can body, and the canned honeycomb filter was placed on a gas burner tester. Then, SiC abrasive grain was collided with the inflow end face of the honeycomb filter by the gas burner tester. The conditions under which the abrasive grain was collided were as follows. The amount of supplied grain was 5 grams. The temperature of the gas to be passed into the honeycomb filter was 700° C. The flow rate of the gas to be passed into the honeycomb filter was 120 m/sec. The testing time was 10 minutes, during which the abrasive grain was supplied little by little. Thereafter, the honeycomb filter was taken out, and the honeycomb filter that had been taken out was photographed by computed tomography (CT), and the scraping depth in the honeycomb filter caused by the collision of the abrasive grain (an erosion depth (mm)) was calculated. In the measurement test of the erosion amount, abrasive grain having an average particle diameter of 50 μm was used. The "erosion resistance" of the honeycomb filter was evaluated according to the following evaluation standards. For Examples 1 to 10, Comparative Example 1 was defined as the reference honeycomb filter. "Ratio of erosion depth (%)" of Table 2 shows the ratios of the erosion depths of the honeycomb filters to be evaluated when the erosion depth of the reference honeycomb filter is defined as 100%.

Evaluation "Excellent": If the value of the ratio of the erosion depth is below 70%, then the evaluation result is denoted by "Excellent."

Evaluation "Acceptable": If the value of the ratio of the erosion depth is 80% or more and below 100%, then the evaluation result is denoted by "Acceptable."

Evaluation "Fail": If the value of the ratio of the erosion depth is 100% or more, then the evaluation result is denoted by "Fail."

Examples 2 to 10

Honeycomb filters were manufactured according to the same method as that used for the honeycomb filter of Example 1 except that the configurations of the plugging portions were changed as shown in Table 1. In the honeycomb filters of Examples 2 to 5 and 7 to 10, the plugging portions existing in the circumferential region of the section that is orthogonal to the extending direction of the cells of the honeycomb structure had the voids therein. More specifically, in the foregoing section of the honeycomb filter of each of Examples 2 to 5 and 7 to 10, the plugging portions existing in a region expanding to the eighth cells counted from the cells positioned at the outermost circumference of the honeycomb structure toward the center of the section had the voids therein. In Examples 2 to 5 and 7 to 10, the viscosity of the plugging material for making the plugging portions was changed in the circumferential region and the central region, and the presence of the voids in the plugging portions was adjusted.

Comparative Examples 1 and 2

Honeycomb filters were manufactured according to the same method as that used for the honeycomb filter of Example 1 except that the configurations of the plugging portions were changed as shown in Table 1. In the honeycomb filter of Comparative Example 1, none of the plugging portions have the voids therein. In the honeycomb filter of Comparative Example 2, although the plugging portions have the voids, the porosity thereof is 66%.

On the honeycomb filters of Examples 2 to 10 and Comparative Examples 1 and 2 also, "Evaluation of exhaust gas purification performance", "Evaluation of falling off of plugging portion", and "Evaluation of erosion resistance" were carried out according to the same method as that used for Example 1. Table 2 shows the results.

TABLE 2

|  | Ratio of NOx purification rate (%) | Ratio of erosion depth (%) | Evaluation of exhaust gas purification performance | Evaluation of erosion resistance | Evaluation of falling off of plugging portion |
|---|---|---|---|---|---|
| Example 1 | 106 | 81 | Acceptable | Acceptable | OK |
| Example 2 | 109 | 71 | Good | Good | OK |
| Example 3 | 109 | 71 | Good | Good | OK |
| Example 4 | 108 | 65 | Good | Excellent | OK |
| Example 5 | 113 | 83 | Excellent | Acceptable | OK |
| Example 6 | 109 | 87 | Good | Acceptable | OK |
| Example 7 | 112 | 77 | Excellent | Good | OK |
| Example 8 | 112 | 71 | Excellent | Good | OK |
| Example 9 | 101 | 88 | Acceptable | Acceptable | OK |
| Example 10 | 114 | 48 | Excellent | Excellent | OK |
| Comparative Example 1 | 100 | 100 | Reference | Reference | NG |
| Comparative Example 2 | 99 | 50 | Fail | Excellent | NG |

Evaluation "Good": If the value of the ratio of the erosion depth is 70% or more and below 80%, then the evaluation result is denoted by "Good."

(Results)

In the results of "Evaluation of exhaust gas purification performance", "Evaluation of falling off of plugging portion", and "Evaluation of erosion resistance" of the honeycomb filters of Examples 1 to 10 were proven to be better than those of the honeycomb filter of Comparative Example 1, which is the reference. Thus, it was verified that the honeycomb filters of Examples 1 to 10 exhibited high purification performance, prevented the plugging portions from falling off from the cells, and exhibited high erosion resistance, while maintaining required isostatic strength, as compared with conventional honeycomb filters.

INDUSTRIAL APPLICABILITY

The honeycomb filter in accordance with the present invention can be used as a filter for trapping particulate matter in an exhaust gas.

DESCRIPTION OF REFERENCE NUMERALS

1: partition wall; 2: cell; 2a: inflow cell; 2b: outflow cell; 3: circumferential wall; 5: plugging portion; 6: void; 10: honeycomb structure; 11: inflow end face; 12: outflow end face; 15: central region; 16: circumferential region; and 100, 200: honeycomb filter.

What is claimed is:
1. A honeycomb filter comprising:
a pillar-shaped honeycomb structure having porous partition walls placed, surrounding a plurality of cells which serve as fluid through channels extending from an inflow end face to an outflow end face; and
porous plugging portions provided either at the ends on the inflow end face side of the cells or at the ends on the outflow end face side of the cells,
wherein the plugging portions include plugging portions that have voids therein,
in the plugging portions having the voids, porosity including the voids as pores ranges from 68% to 83%,
the plugging portions having the voids exist only in a circumferential region in a section that is orthogonal to an extending direction of the cells of the honeycomb structure, and
the circumferential region is a region that expands to an eighth cell counted toward a center of the section from a cell positioned at the outermost circumference of the honeycomb structure in the section of the honeycomb structure.
2. The honeycomb filter according to claim 1,
wherein each of the plugging portions having the voids has at least one void, an inner diameter of which in a radial direction of an end face of the honeycomb filter ranges from 0.3 mm to 1.1 mm, and the inner diameter of which in the extending direction of the cells ranges from 1.0 mm to 4.0 mm.
3. The honeycomb filter according to claim 1, wherein the porosity of the partition walls ranges from 50% to 70%.

* * * * *